US011493968B2

(12) United States Patent
Eberlein

(10) Patent No.: US 11,493,968 B2
(45) Date of Patent: Nov. 8, 2022

(54) REVERSE BANDGAP REFERENCE CIRCUIT WITH BULK DIODE, AND SWITCH CAPACITOR TEMPERATURE SENSOR WITH DUTY-CYCLE OUTPUT

(71) Applicant: Intel Corporation, Santa Clara, CA (US)

(72) Inventor: Matthias Eberlein, Holzkirchen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/537,439

(22) Filed: Aug. 9, 2019

(65) Prior Publication Data

US 2021/0041928 A1 Feb. 11, 2021

(51) Int. Cl.
*G05F 3/24* (2006.01)
*G06F 1/20* (2006.01)
(Continued)

(52) U.S. Cl.
CPC ............ *G06F 1/206* (2013.01); *G01K 7/015* (2013.01); *G05F 1/468* (2013.01); *G05F 3/242* (2013.01); *G06F 1/3203* (2013.01); *G06F 1/06* (2013.01)

(58) Field of Classification Search
CPC ............ G01K 7/00; G01K 7/01; G01K 7/015; G01K 7/34; G05F 3/00; G05F 3/08; G05F 3/16; G05F 3/18; G05F 3/185; G05F 3/20; G05F 3/205; G05F 3/22; G05F 3/222; G05F 3/225; G05F 3/227; G05F 3/24; G05F 3/242; G05F 3/245; G05F 3/247; G05F 3/30; G05F 3/02; G05F 1/00; G05F 1/02; G05F 1/10; G05F 1/46; G05F 1/462; G05F 1/463; G05F 1/468; G05F 1/567; G06F 1/04; G06F 1/06; G06F 1/26; G06F 1/32;
(Continued)

(56) References Cited

U.S. PATENT DOCUMENTS 5,982,221 A 11/1999 Tuthill
6,060,874 A 5/2000 Doorenbos
(Continued)

FOREIGN PATENT DOCUMENTS

KR 20090104361 10/2009
WO 2017105554 6/2017

OTHER PUBLICATIONS

Hellen, Edward H., "Verifying the diode-capacitor circuit voltage decay", 2003 American Association of Physics Teachers, 4 pgs.
(Continued)

*Primary Examiner* — Thienvu V Tran
*Assistant Examiner* — Carlos O Rivera-Perez
(74) *Attorney, Agent, or Firm* — Schwabe, Williamson & Wyatt, P.C.

(57) ABSTRACT

An apparatus is provided which generates a reverse bandgap reference using capacitive bias, which is applied to a single n-well diode. The capacitive bias allows for determining the current density precisely by pure timing control. An apparatus is also described for sensing temperature in which a forward-bias diode voltage can be sampled with a capacitor, and large current ratios are possible (e.g., ratio N greater than 1000). Duty cycle of a digital output of the sensor is used to determine the temperature sensed by the sensor.

20 Claims, 13 Drawing Sheets

(51) Int. Cl.
  *G01K 7/01*    (2006.01)
  *G06F 1/3203*  (2019.01)
  *G05F 1/46*    (2006.01)
  *G06F 1/06*    (2006.01)

(58) Field of Classification Search
  CPC ...... G06F 1/3203; G06F 1/3225; G06F 1/206;
       G06F 1/20; H03H 19/00; H03H 19/004;
       H03H 19/006; H02M 3/06; H02M 3/07;
       H02M 3/073; H02M 2003/071; H02M
       2003/072; H02M 2003/075; H02M
       2003/076; H02M 2003/077; H02M
       2003/0782; H02M 2003/078
  USPC ............... 323/266, 271–275, 281–285, 304,
       323/311–317; 327/534–543
  See application file for complete search history.

(56) References Cited

U.S. PATENT DOCUMENTS

| | | | |
|---|---|---|---|
| 6,097,239 | A | 8/2000 | Miranda, Jr. et al. |
| 6,847,319 | B1 | 1/2005 | Stockstad |
| 6,869,216 | B1 | 3/2005 | Holloway et al. |
| 7,010,440 | B1 | 3/2006 | Lillis et al. |
| 7,312,648 | B2 | 12/2007 | Yang |
| 8,461,912 | B1 | 6/2013 | Kumar |
| 10,061,336 | B1 * | 8/2018 | Shor .......................... G05F 3/30 |
| 2003/0090277 | A1 | 5/2003 | Lechner et al. |
| 2007/0035973 | A1 * | 2/2007 | Kitazaki ................ H02M 3/073 |
| | | | 363/59 |
| 2011/0102058 | A1 | 5/2011 | Conte et al. |
| 2016/0224146 | A1 * | 8/2016 | Malevsky ............... G06F 3/044 |
| 2017/0089765 | A1 * | 3/2017 | Eberlein ................. G01K 7/01 |
| 2017/0285680 | A1 * | 10/2017 | Eberlein ................ G05F 3/245 |
| 2019/0041272 | A1 | 2/2019 | Eberlein |
| 2021/0063250 | A1 | 3/2021 | Park et al. |

OTHER PUBLICATIONS

International Search Report and Written Opinion from PCT/US2020/041429 dated Oct. 29, 2020, 12 pgs.
Eberlein, Matthias et al., "Time-Controlled and FinFET Compatible Sub-Bandgap References using Bulk-Diodes", Circuits and Systems II: Express Briefs, IEEE Transactions on, Jul. 2019, 5 pgs.
Final Office Action from U.S. Appl. No. 15/942,163 dated Nov. 17, 2020, 8 pgs.
Non-Final Office Action from U.S. Appl. No. 15/942,163 dated Aug. 3, 2020, 7 pgs.
Notice of Allowance from U.S. Appl. No. 15/942,163 dated Feb. 1, 2021, 8 pgs.
Restriction Requirement from U.S. Appl. No. 15/942,163 dated May 18, 2020, 6 pgs.
Non-Final Office Action from U.S. Appl. No. 17/240,861 dated Aug. 9, 2022, 25 pgs.

* cited by examiner

REVERSE BANDGAP REFERENCE CIRCUIT WITH BULK DIODE, AND SWITCH CAPACITOR TEMPERATURE SENSOR WITH DUTY-CYCLE OUTPUT

BACKGROUND

Traditional bandgap references use analog components such as: amplifiers, metal oxide semiconductor (MOS) current sources, current mirrors, resistors, etc., which need to meet certain performance for accuracy, e.g., matching. These components are difficult to implement in a "digital" process and do not scale well with future nodes. Specifically the ratio of bipolar junction transistor (BJTs) or currents is limited to values of, for example, N=8 . . . 20, which results in a small proportional to absolute temperature (PTAT)-voltage, sensitive to offset and mismatch errors. Existing solutions for generating bandgap references do not perform at very low biasing conditions, like vdd less than 1.0V, or currents much less than 2 μA, which would be required for wearables and Internet-of-things (IoT) applications. Especially the quality of BJT is poor in Fin field effect transistor (FinFET) process, resulting in large spread of the output voltage reference (Vref).

Thermal management becomes increasingly critical, especially with high computing power of mobile devices (e.g., 4G modems, 5G communication devices). Most existing temperature sensor concepts evaluate the Vbe voltage (base-emitted voltage) of a bipolar transistor used as sensing element (NPN or PNP parasitic device in digital Complementary Metal Oxide Semiconductor (CMOS)). Yet several measures are required to achieve linearity, including two-point trim, chopping, low-noise supply, or specific process features. For precise measurements of temperature, conventional thermal sensors in such devices or systems usually rely on parasitic PNP components (e.g., parasitic PNP bipolar transistors). However, in some fabrication technologies, the quality of such PNP components may degrade drastically due to factors such as micro-defects in junctions (e.g., emitter-base junction) in the PNP components. Further, some conventional thermal sensors may need multi-point trim for sensing adjustment in order to meet specific measurement accuracy. Moreover, in some fabrication processes, options for forming such PNP components in the device may be limited or may be non-existent. Thus, for the at least reasons mentioned herein, designing thermal sensors in some conventional devices may pose a challenge.

Especially, circuits for "classic sensors" tend to be very complex, as they combine bandgap reference, sigma-delta analog-to-digital converter, clocking, etc. Existing temperature sensors are not scaling and have challenges when implemented in FinFET (fin Field Effect Transistors) based technologies. Sufficient performance is achieved only through costly trimming and high complexity, impacting area and power.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
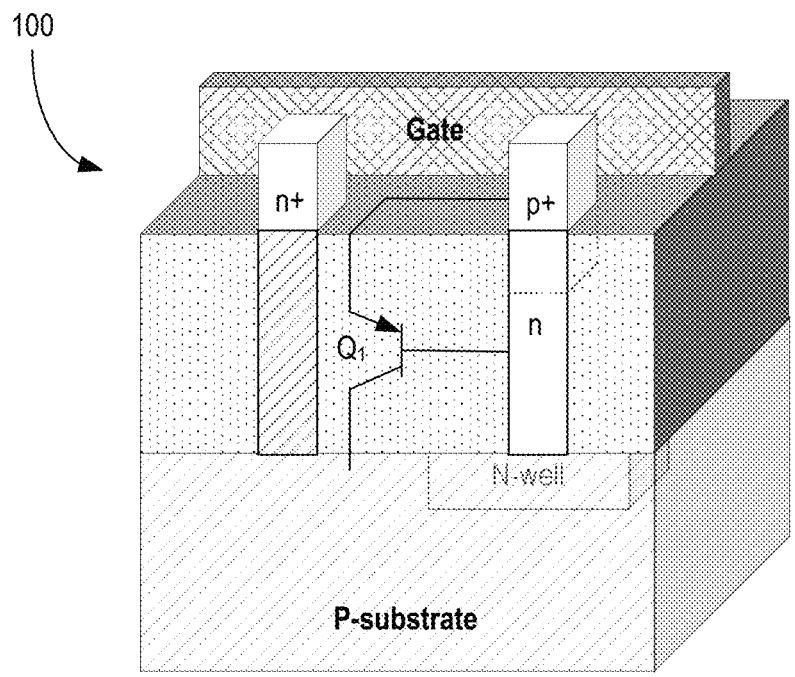
FIG. 1 illustrates a PNP bipolar junction in a FinFET process technology node.

In some embodiments, capacitive bias is applied to a single n well-diode, which allows determining the current density precisely by pure timing control. As such, very large current ratios of (e.g., N much greater than 1000) can be achieved. The voltage drop at different bias conditions is stored on two capacitors, scaled and finally added by switching techniques. The resulting output equals a "reverse bandgap" reference, with temperature compensation achieved by capacitor and pulse ratios. In various embodiments, the bandgap reference circuit comprises merely capacitors and switches, driven by a pulse generator, and is therefore compatible to digital design and FinFET.

There are many technical effects of the bandgap reference circuit of various embodiments. For example, the circuit is a FinFET based digital design that is scaling friendly and uses no resistors, amplifiers, biasing current mirrors, start-up circuitries, offset compensation, etc. The bandgap reference circuit of some embodiments operates at ultra-low power supply level, which is suitable for Internet-of-Things (IoT). For example, the current bias for the circuit is lower than 20 nA and the supply voltage level is less than 0.9V. The bandgap reference circuit of some embodiments is a simple circuit that occupies a very small area (e.g., less than 2000 $\mu m^2$). The bandgap reference circuit of some embodiments provides a highly precise output To enable multi-spot temperature sensing on small grid, a sensor solution requires: high accuracy (e.g., error less than 5° C.), scaling and FinFET compatible, low voltage operation (e.g., supply less than 1.1 V), low test cost (e.g., to avoid trim points), low system overhead ("smart" digital output), small area (less than 4000 $\mu m^2$). It is a challenge for classic circuits to meet the above criteria using bandgap reference type circuits.

Some embodiments, use an N-well-to-substrate junction, available in all CMOS and FinFET process technology nodes, as a thermal sensing element. This diode formed from such junction is usually of high quality, and typically in reverse bias configuration (e.g., because the p-type substrate may be tied to ground). In some embodiments, capacitive bias is applied to the diode instead of the traditional technique of using ratioed resistors and/or current sources to bias the diode(s). As such, a nearly-digital circuit is realized that is used to determine a current density precisely by timing control. As such, a forward-bias diode voltage can be sampled with a capacitor, and large current ratios are possible (e.g., ratio N greater than 1000).

At a certain temperature Tx (to be measured), the sampled voltages with opposite temperature coefficient (e.g., PTAT and CTAT) are equal. In various embodiments, this crossover point is measured by means of time, and Tx is calculated from the resulting duty cycle. Here, the term "PTAT" refers to proportional to absolute temperature, and "CTAT" refers complementary to absolute temperature.

There are many technical effects of the thermal sensor circuit of the various embodiments. For example, the thermal sensors of various embodiments are a digital-friendly concept that uses digitally controlled transistors as switches to charge and discharge the capacitors and to bias the diode. In various embodiments, but for a comparator, all devices are digitally controlled. The diode of various embodiments is robust because it is an N-well diode, which is buried in the die, and does not degrade by process scaling or non-uniform doping, or surface defects, as they are present especially for junctions within FinFET structures. As such, the temperature-sensing element of various embodiments is a robust element. The temperature-sensing architecture of various embodiments is simple in that it uses a two-terminal diode for sensing instead of the three-terminal PNP based diode. As such, fewer process parameters are involved in realizing the diode. The temperature sensing architecture of various embodiments is smaller in area and complexity compared to traditional sensors that use ratioed-resistor, current sources, and PNP based sensing elements.

The temperature sensing architecture of various embodiments can operate at low power supplies, such as a 0.85 V power supply, and intrinsically has power supply rejection ratio (PSRR) because the design is timing based. The temperature-sensing architecture of various embodiments has higher accuracy than traditional temperature sensors because it uses zero or one-point trimming of the sensor to achieve less than 4-degree Celsius error. The term "trimming" is a term of art for thermal sensors, which is used to calibrate the sensor by adjusting device parameters such as input offset, current density, etc. to mitigate sensing errors and to calibrate the accuracy of the sensor. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +1-10% of a predetermined target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

Here, multiple non-silicon semiconductor material layers may be stacked within a single fin structure. The multiple non-silicon semiconductor material layers may include one or more "P-type" layers that are suitable (e.g., offer higher hole mobility than silicon) for P-type transistors. The multiple non-silicon semiconductor material layers may further include one or more one or more "N-type" layers that are suitable (e.g., offer higher electron mobility than silicon) for N-type transistors. The multiple non-silicon semiconductor material layers may further include one or more intervening layers separating the N-type from the P-type layers. The intervening layers may be at least partially sacrificial, for example to allow one or more of a gate, source, or drain to wrap completely around a channel region of one or more of the N-type and P-type transistors. The multiple non-silicon semiconductor material layers may be fabricated, at least in part, with self-aligned techniques such that a stacked CMOS device may include both a high-mobility N-type and P-type transistor with a footprint of a single finFET.

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

It is pointed out that elements of a figure having the same reference numbers (or names) as the elements of any other figure can operate or function in any manner similar to that described but are not limited to such.

FIG. 1 illustrates PNP bipolar junction 100 in a FinFET process technology node. Traditional thermal sensors use PNP or NPN based bipolar transistor junction (BJT) for sensing temperature. The BJT, as shown in FIG. 1 is formed by the PNP junction using a source terminal, the N-well, and the p-type substrate. However, one major issue with BJT based thermal sensors and bandgap reference circuits is that they use a costly trimming process that requires extra circuitry and time. For example, the complexity of the trimming process where the thermal sensor is calibrated to cancel for errors, increases the area and test effort. The BJT used for thermal sensors and bandgap reference circuits also exhibits poor linearity as the process scales. In FinFET process technology nodes, the parasitic PNP suffers from inhomogeneous (e.g., leaky) p-n junctions, squeezed between the fins as shown in FIG. 1. Electrical characteristic for just a BJT is unstable due to large base-width (e.g., the width of the N-well).

Figure 2:
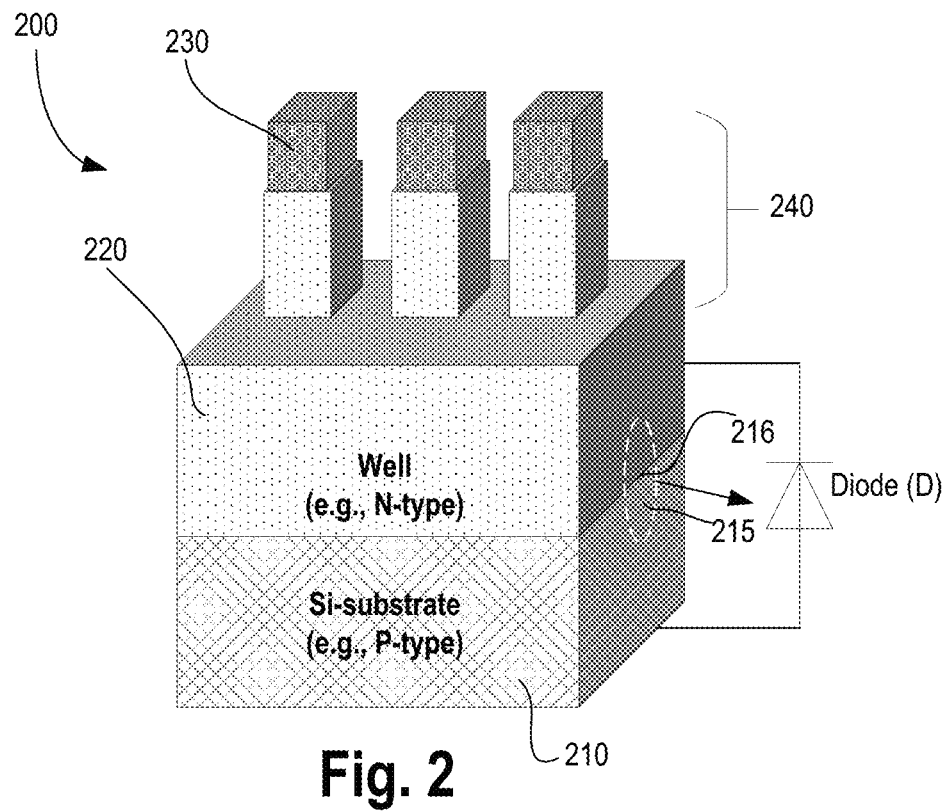
FIG. 2 illustrates a p-n junction diode, formed between a substrate and a well, for use in a thermal sensor, in accordance with some embodiments.

FIG. 2 illustrates apparatus 200 showing a p-n junction diode D, formed between a substrate 210 and a well 220 (or portion 220), for use in a thermal sensor, in accordance with some embodiments. Apparatus 200 is used to form the diode D for the switch-capacitor based thermal sensor design. In some embodiments, apparatus 200 includes substrate 210, portion 220 directly contacting substrate 210, and portions 230. In some embodiments, substrate 210 can include p-type material (e.g., p-type silicon). Portion 220 can be part of a well (e.g., n-well) formed in or formed on substrate 210, such that portion 220 and substrate 210 have different types of materials. For example, portion 220 can include an n-type material (e.g., n-type silicon). In some embodiments, portions 230 and portion 220 can also have different types of materials that may form part of a transistor structure 240. For example, portions 220 can include a p-type material (e.g., p-type silicon material). Thus, substrate 210, portion 220, and portions 230 can have p-type, n-type, and p-type materials, respectively (e.g., p-type silicon, n-type silicon, and p-type silicon, respectively).

Transistor structure 240 can include multi-gate transistors (e.g., multi-gate field-effect transistors (FETs)). Examples of such multi-gate transistors include tri-gate transistors, fin-FETs, and other types of multi-gate transistors. Here, region 215 is formed by part of substrate 210 and part of portion 220 (e.g., part of an n-well). Region 215 has a junction 216 where part of substrate 210 directly contacts part of portion 220. Thus, junction 216 can include a p-n junction formed by p-type material of substrate 210 and n-type material of portion 220. This p-n junction forms the diode D that is used for implementing the switch capacitor based thermal sensor.

For simplicity, merely one diode D corresponding to one region 215 is shown. However, multiple diodes (e.g., similar to diode D) can be formed from multiple regions similar to region 215. For example, substrate 210 can include p-type material and different regions of substrate 210 can be doped with dopants of n-type material to form multiple n-type doped regions in substrate 210. The junctions (e.g., similar to junction 216) between the multiple n-type doped regions and substrate 210 can form multiple p-n junctions that can be part of multiple diodes. In such n-type doped regions, the size in one n-type doped region can be different from the size of another n-type doped region. This allows diodes formed from n-type doped regions in substrate 210 to have different current densities (e.g., different ratio-sized diodes). As such, multiple (e.g., two) diodes similar to diode D having different current densities (e.g., different sizes) can be formed in substrate 210 by forming different n-doped regions in substrate 210.

Figure 3:
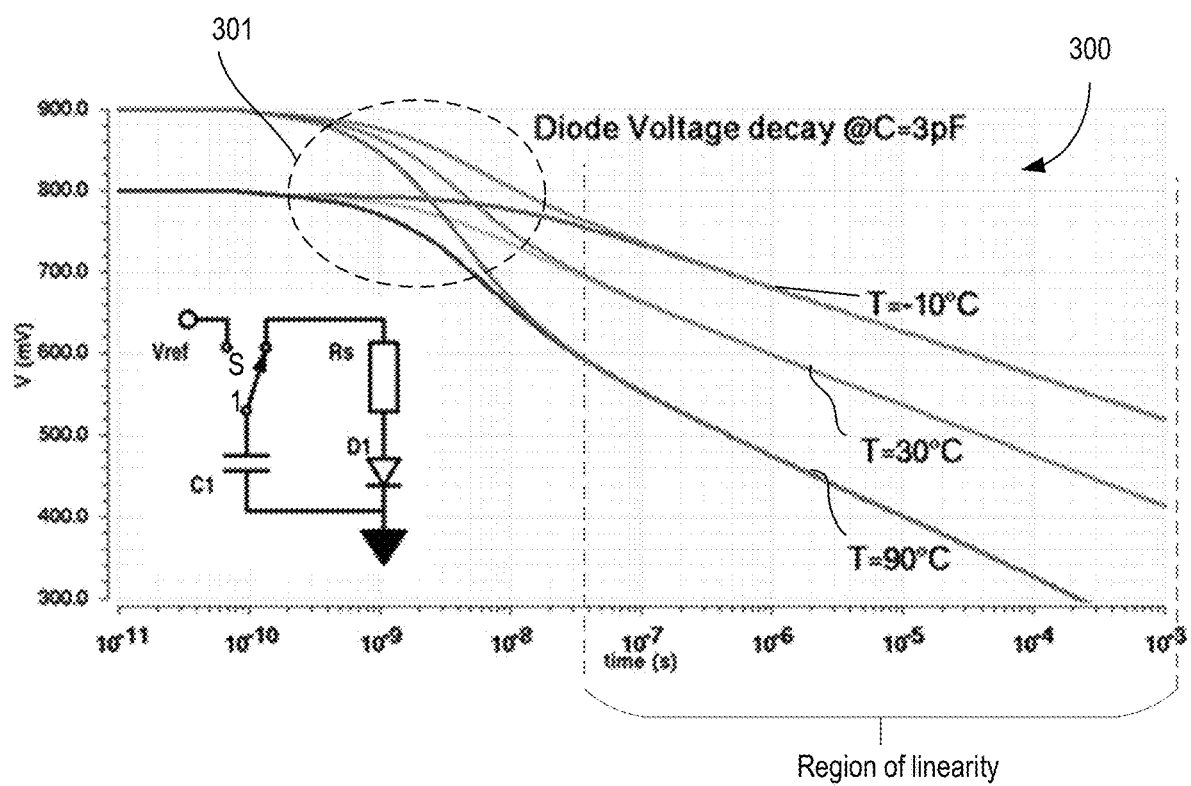
FIG. 3 illustrates a plot showing voltage decay for a switched capacitor coupled in parallel to a p-n junction diode, in accordance with some embodiments.

FIG. 3 illustrates plot 300 showing voltage decay for a switched capacitor coupled in parallel to a p-n junction diode, in accordance with some embodiments. Here, the x-axis is time (in seconds (s)) and the y-axis is voltage on the capacitor C1. The circuit inside plot 300 is of a capacitive bias circuit, which comprises capacitor C1, switch S1, reference node Vref, resistor Rs, and diode D1 coupled together as shown. The capacitive bias is applied to diode D1 instead of traditional technique through resistors or current sources. This results in a nearly digital circuit and allows to determine a current density precisely by timing control of switch S1. As such, the forward-diode voltage can be sampled with a capacitor, and huge current ratios are possible (e.g., N greater than 1000). In some embodiments, the extracted samples can be used to create signals with opposite temperature coefficient (PTAT and CTAT). In some embodiments, at a certain temperature Tx (to be measured), the PTAT and CTAT signals are equal, and this cross-over point is adjusted by either capacitor ratios or sampling time, and finally temperature Tx is calculated.

In some embodiments, a bandgap circuit is generated using the characteristics of the capacitor voltage decay. When capacitor C1 is pre-charged to a voltage Vref, and then connected to diode D1, the resulting voltage over time can be calculated as follows (neglecting series resistor Rs):

$$V_D(t) = -V_T \cdot \ln\left\{1 - \left[1 - e^{\frac{-Vref}{V_T}}\right] \cdot e^{\frac{-Is}{C \cdot V_T} \cdot t}\right\} \quad [1]$$

In the short time, the diode voltage $V_D(t)$ can be expressed as:

$$V_D(t) = -V_T \cdot \ln\left\{e^{\frac{-Vref}{V_T}}\right\} + \frac{-Is}{C \cdot V_T} \cdot t\} \quad [2]$$

In the medium time (e.g., t approximately equal to greater than 50 ns), the diode voltage $V_D(t)$ can be expressed as:

$$V_D(t) = -V_T \cdot \ln\left(\frac{-Is}{C \cdot V_T} \cdot t\right) \quad [3]$$

In the long time, the diode voltage $V_D(t)$ can be expressed as:

$$V_D(t) = -V_T \cdot \ln\left\{1 - \frac{-Is}{C \cdot V_T}\right\} \quad [4]$$

Plot 300 shows that for a major time period, the voltage of the diode (which is the voltage on capacitor C1) follows a strict logarithmic function versus time. This function does not depend on the initial bias or serial resistance due to low current levels. Therefore, by choosing sampling times (e.g., greater than 50 ns), the current density can be precisely controlled in accordance with some embodiments.

This medium time period is limited at very low current levels (e.g., long time) by leakage effects from connected devices, adding nonlinearities. During the short initial period $V_D(t)$ depends on Vref, as indicated by equation (2). Same can be observed from simulations for different temperatures as indicated by plot 300. Independent of initial conditions, the $V_D(t)$ characteristic follows a well-defined (linear) function over several decades of time. This technique can generate extremely low current levels (e.g., less than 1 nA), yielding huge and precise ratios of N much greater than 1000. Some embodiments utilize this relation to generate a very large and accurate PTAT voltage, by sampling the diode-voltage at different times.

Here, region 301 shows the non-linear behavior at three different temperatures (10 degrees C., 30 degrees C., and 90 degrees C.). This non-linear behavior is due to the resistance of resistor Rs. The voltage behavior then becomes linear providing a well-controlled circuit parameter for measuring temperature.

Figure 4:
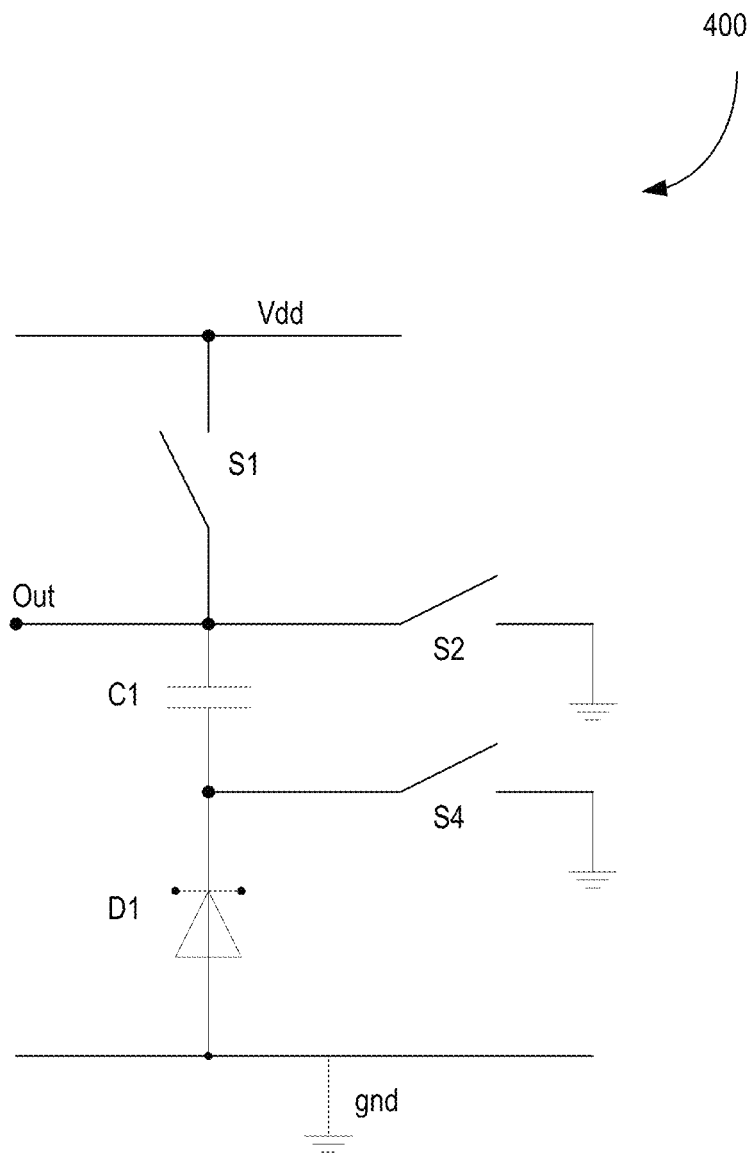
FIG. 4 illustrates a schematic of a switched capacitor network with a diode, which is sampled by negative bias, in accordance with some embodiments.

FIG. 4 illustrates schematic 400 of a switched capacitor network with a diode which is sampled by a negative bias, in accordance with some embodiments. Schematic 400 illustrates the bulk diode used as temperature sensing device of various embodiments. The circuit of schematic 400 comprises diode D1, capacitor C1, switches S1, S2, and S4, supply node Vdd, and ground node and coupled together as shown. In some embodiments, since the n-well has the anode of the diode tied to the substrate, a negative voltage is used to forward-bias the diode D1. Some embodiments use a combined charge-pump and voltage sampling circuit to provide forward-bias to the diode. In some embodiments, capacitor C1 is charged to Vdd by closing switches S1 and S4 and opening switch S2. As such, the output "out" is charged to Vdd. The switches can be implemented as transistors (e.g., n-type, p-type, or a combination of them). In some embodiments, the capacitor C1 is discharged by closing switch S2 which couples "out" to ground, while opening switches S1 and S4. As such, a negative bias is provided to the cathode of diode D1. In other words, Vdd is pumped to a negative voltage level (−Vdd) at the cathode of diode D1 so that diode D1 is forward biased.

Figure 5A:
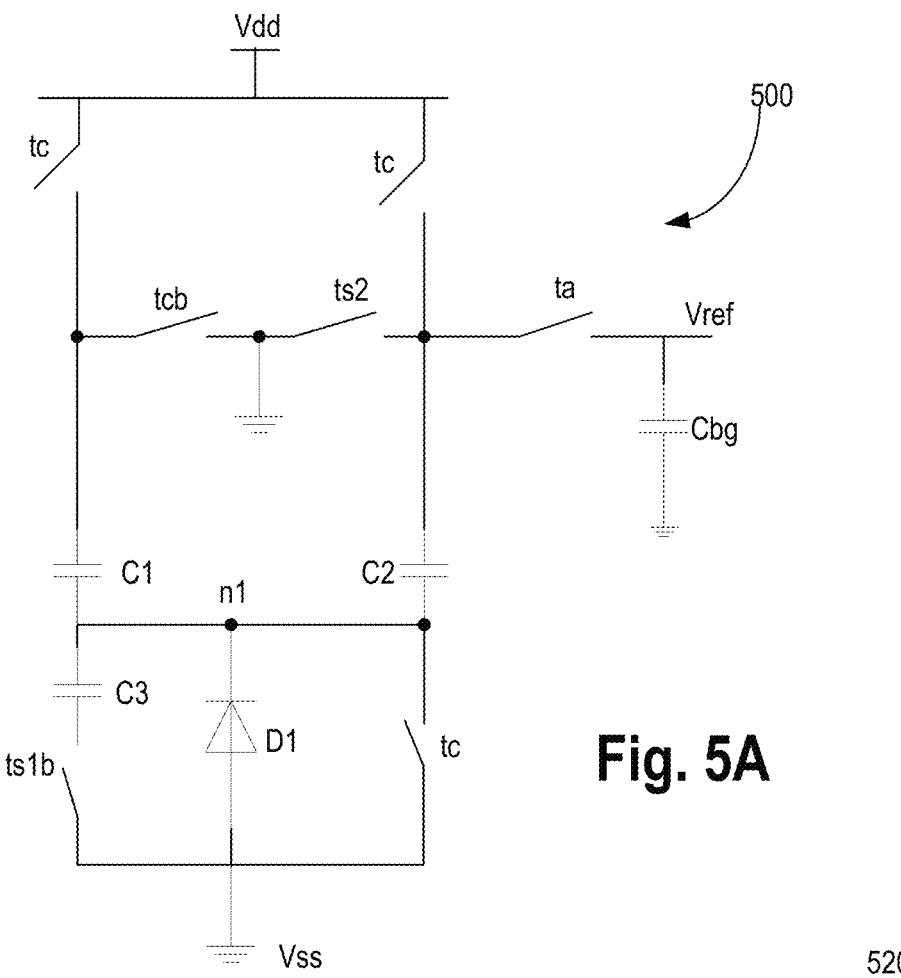
FIG. 5A illustrates a functional schematic of a time-controlled bandgap circuit with switched capacitor scheme, in accordance with some embodiments of the disclosure.

FIG. 5A illustrates a functional schematic 500 of a time-controlled bandgap with switched capacitor scheme, in accordance with some embodiments of the disclosure. A bandgap voltage is generated by addition of PTAT and CTAT parts, and can be expressed as:

$$Vbg = V(\text{CTAT}) + k \cdot V(\text{PTAT}) = Vd2 + k \cdot \Delta V = (k+1)Vd2 - k \cdot Vd1 \quad (5)$$

Schematic 500 generates a reverse bandgap. Reverse bandgap is expressed as:

$$Vrbg = \frac{Vbg}{k+1} = Vd2 - \left(\frac{k}{k+1}\right) \cdot Vd1 \quad (6)$$

The PTAT part is expressed as:

$$\Delta Vd = VT \cdot \ln(N) \quad (7)$$

Where 'N' is the ratio of current densities of Vd1 and Vd2. The factor 'k' is used to achieve temperature compensation and is typically approximately 9, while ln(N) is approximately 2 resulting in Vrbg of approximately 120 mV.

With the capacitive bias technique of various embodiments, much larger values of N can be achieved. This results in smaller value for 'k', and therefore higher and more accurate reference voltage. For instance, with $N=10^4$, k is approximately 2, and Vrbg is approximately 400 mV.

Schematic 500 of the reverse bandgap circuit comprises a single diode D1 which is connected in reverse bias configuration. For example, the anode of diode D1 is coupled to ground (Vss), while the cathode of diode D1 is coupled to node n1. In various embodiments, reverse bandgap circuit comprises capacitors C1, C2, C3, and Cbg and switches controllable by tc, ts1, ts2, ta, tcb, and ts1b coupled together as shown. The suffix 'b' after the end of the control signals that control the switches indicates a complementary signal. For example, tcb is complementary or inverse of signal tc; ts1b is complementary or inverse of signal ts1.

Figure 5B:
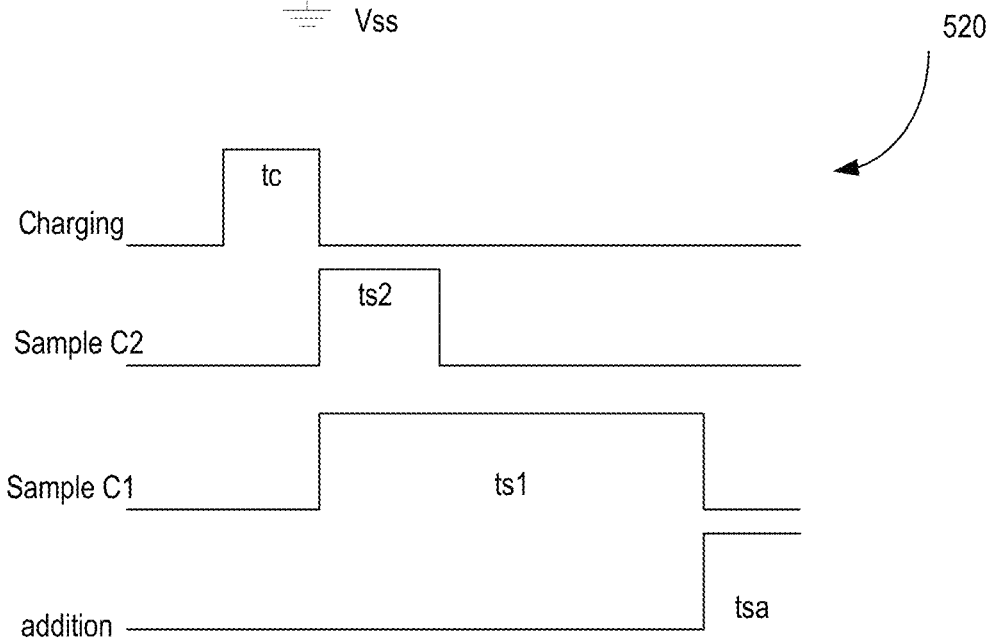
FIG. 5B illustrates a timing diagram associated with the schematic of FIG. 5A showing the principle of reference generation in four phases, in accordance with some embodiments.

The reverse bandgap circuit uses nwell bulk-diodes together with capacitor switching and charge sharing, realized in four phases with timings tc, ts1, ts2, and ta as indicated by timing diagram 520 of FIG. 5B.

In phase 1 (tc), capacitors C1 and C2 are charged to an arbitrary level (e.g., greater than 0.8V), which can be supply Vdd. Capacitor C3 is discharged (e.g., reset, used later for scaling). In phase 2 (ts2), capacitors C1 and C2 are discharged through diode D1, and at the end the voltage V(C2) is sampled by disconnecting the top plate of capacitor C2. In phase 3 (ts1), capacitor C1 is further discharged through diode D1, and V(C1) is sampled. In the last phase (ta), the sampled voltages Vd2=Vd(ts2) and Vd1=Vd(ts1) are effectively subtracted by series connection, while at the same time Vd1=V(C1) is scaled by merging C1 with C3. The resulting output voltage Vout or Vref is given as:

$$Vout = Vd2 - \frac{C1}{C1 + C3} \cdot Vd1 \quad (8)$$

Figure 6:
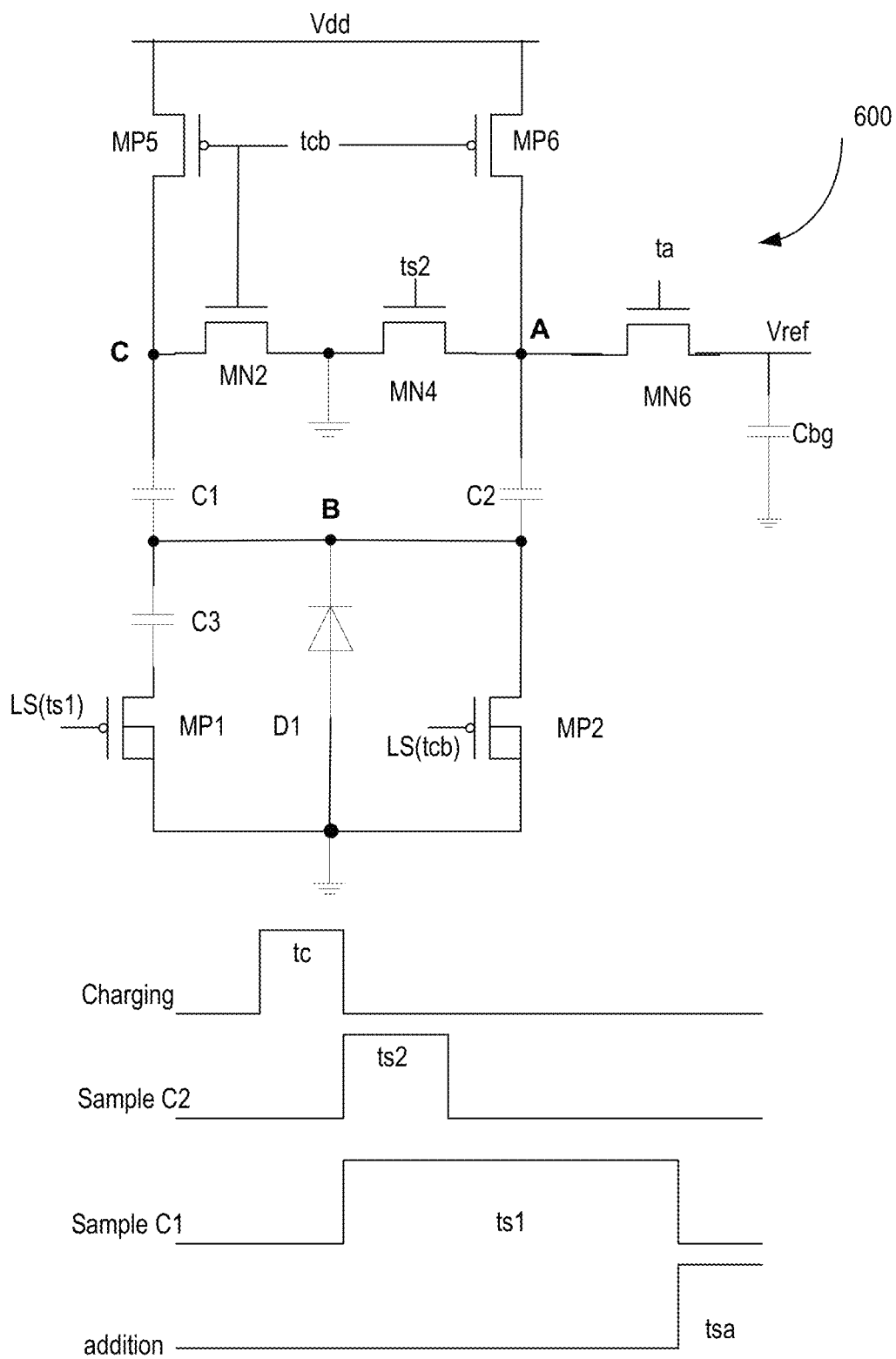
FIG. 6 illustrates a circuit-level schematic of the time-controlled bandgap circuit with switched capacitor scheme, in accordance with some embodiments of the disclosure.

FIG. 6 illustrates circuit-level schematic 600 of the time-controlled bandgap with switched capacitor scheme, in accordance with some embodiments of the disclosure. Bandgap reference circuit of FIG. 6 comprises p-type devices MP1, MP2, MP5, and MP6; n-type devices MN2, MN4, MN6; diode D1, and capacitors C1, C2, C3, and Cbg coupled together as shown. Here phases 2 and 3 are merged, therefore overlapping the pulses ts1 and ts2. Switches are arranged for optimum on/off-performance and latch-up prevention. For this reason, transistors MP1 and MP2 are realized with PMOS transistors, for example, which are driven by "negative level-shifted" signals ts1 and tc (e.g., voltage level of 0V or −Vdd). In some embodiments, a continuous output signal can be achieved through repeated operation of phases 1 through 4, and by sampling of Vout to another capacitor (Cbg) or buffer. By using substrate/nwell-diode D1, instead of BJTs, more reliable and precise junction is achieved than PNP devices due to the buried nature of nwell.

Figure 7A:
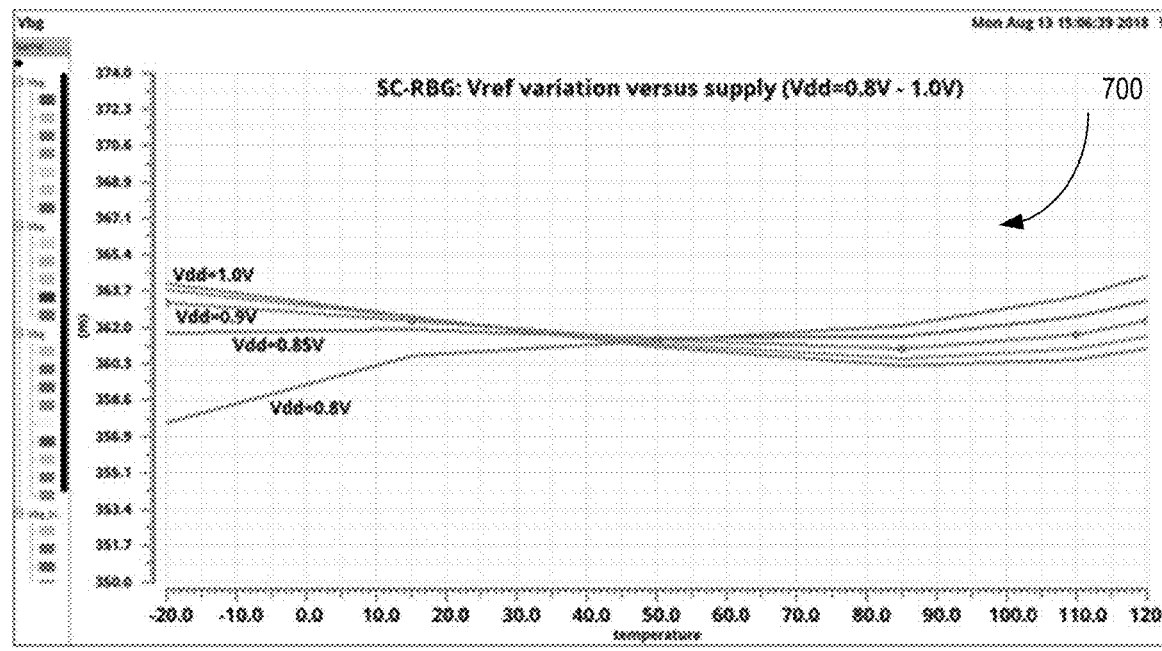
FIG. 7A illustrates a plot of output voltage (Vout) vs. temperature for different supply and pre-charge levels, in accordance with some embodiments.
Figure 7B:
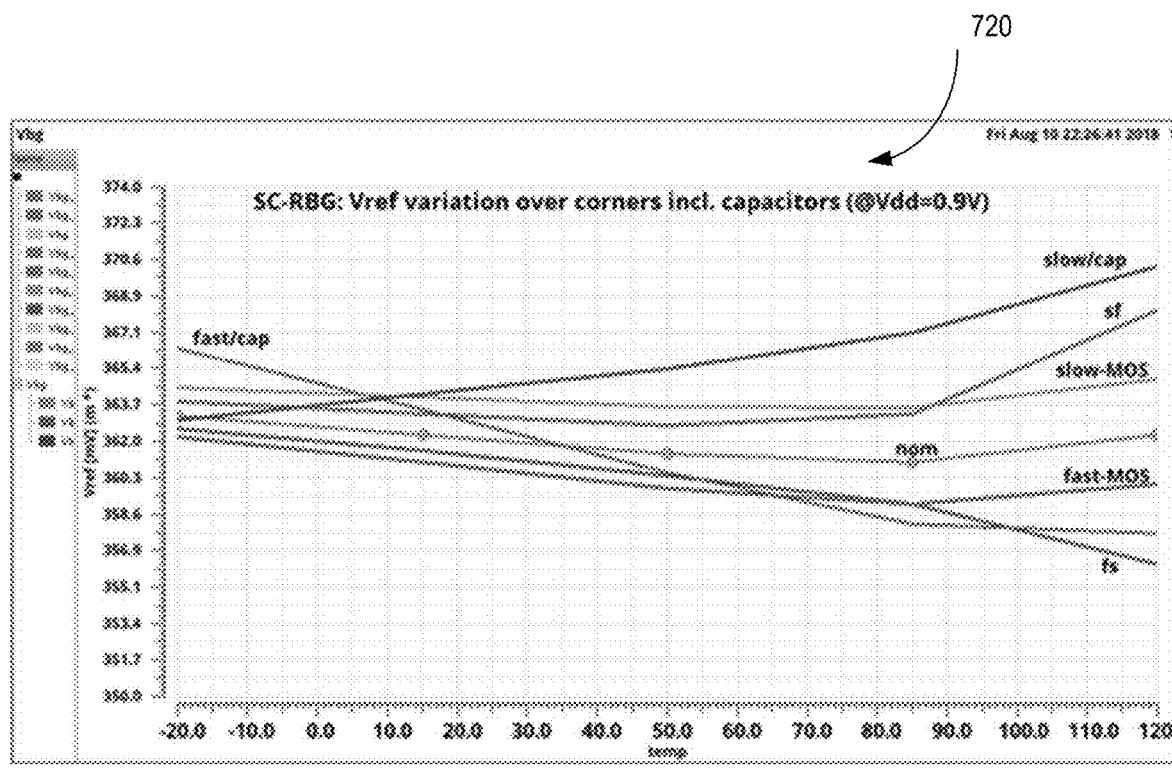
FIG. 7B illustrates a plot of output voltage (Vout) vs. temperature for different process corners, in accordance with some embodiments.

FIG. 7A illustrates plot 700 of output voltage (Vout) vs. temperature for different supply and pre-charge levels, in accordance with some embodiments. FIG. 7B illustrates plot 800 of output voltage (Vout) vs. temperature for different process corners, in accordance with some embodiments. The simulation results illustrates in plots 700 and 720 show the robustness of the circuit topology of FIG. 6, which operates in fully-digital manner In this example uses ts1=50 ns, ts2=100 us, C1=1 pF and C2=2 pF, which yields an effective diode current-ratio of N=6000. In some examples, at high temperatures, the performance is affected by switch leakage.

Figure 8A:
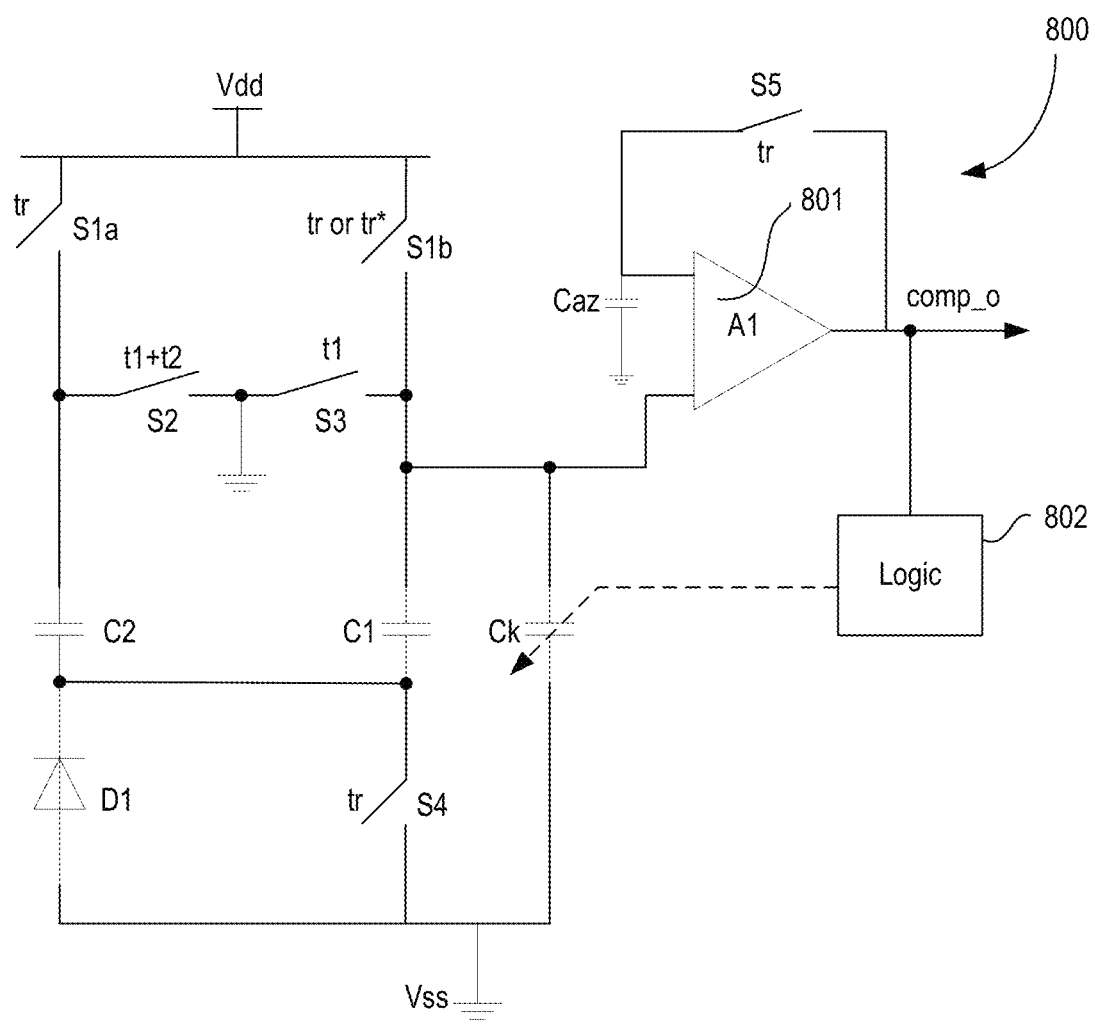
FIG. 8A illustrates a functional schematic of a thermal sensor with switched capacitor scheme and duty-cycle output, in accordance with some embodiments of the disclosure.

FIG. 8A illustrates a functional schematic of a thermal sensor 800 with switched capacitor scheme and duty-cycle output, in accordance with some embodiments of the disclosure. Thermal sensor 800 comprises switches S1a, S1b, S2, S3, S4, and S5; capacitors C1, C1, Ck, and Caz, diode D1, amplifier 801 (with gain A1), and Logic 802 coupled as shown. Switches Sa1, Sab, S4, and S5 are controllable by tr. Switch S2 is controllable by (t1+t2). Switch S3 is controllable by t1. The time control of capacitor-voltage decay forms the basis of the operation of thermal sensor 800.

When a capacitor is pre-charged to Vref (e.g., greater than a pn-junction build-in potential), and then connected to diode D1, the resulting voltage overtime (t) can calculated. For time 't' greater than approximately 40 nS, the diode voltage is described as:

$$V_D(t) = -\eta \cdot V_T \cdot \ln\left(\frac{-Is}{CV_T} \cdot t\right) \quad (9)$$

Where η is an ideality factor, $V_T = kbT/q$ is the thermal voltage, and Is is the saturation current. For a major time period the diode (=capacitor) voltage follows a strict logarithmic function vs. time, which does not depend on initial bias or serial resistance (due to low current levels). Therefore, the current density can be precisely controlled by time t.

The sequence of the operational phases brings a PTAT voltage (e.g., a positive temperature coefficient voltage) and a CTAT voltage (e.g., a negative temperature coefficient voltage) in equilibrium. For example:

$$Vctat = x \cdot Vptat \quad (10)$$

where 'x' is an adjustable voltage-scaling factor.

In some embodiments, for the CTAT part, the diode voltage is sampled at time t1 to provide:

$$Vctat = Vd(t1) = V_{G0} + t_c \cdot T \quad (11)$$

with $V_{G0}$ being the silicon bandgap and $t_c$ being the temperature coefficient.

In some embodiments, the PTAT part is extracted from the delta between the sampling points t1 and t2. Using the formula for capacitance voltage decay, the PTAT voltage can be expressed as:

$$Vptat = Vd(t1) - Vd(t2) = \eta \cdot V_T \cdot \ln\left(\frac{C1 \cdot t2}{C2 \cdot t1}\right) \quad (12)$$

With Vctat==x·Vptat, the temperature can be calculated as:

$$T_x = \frac{V_{G0}}{\eta \cdot \frac{K_B}{e} \cdot x \cdot \ln\left(\frac{C1 \cdot t2}{C2 \cdot t1}\right) - t_c} \quad (13)$$

Using equations [11] and [12], with equilibrium condition [10], yields the scaling factor 'k' as:

$$Vd(t1) = \frac{x}{x-1} \cdot Vd(t2) \quad (14)$$

the scaling factor 'k' is:

$$k = \frac{x}{x-1} \quad (15)$$

The third capacitor Ck is used to generate scaling factor 'k' by charge sharing during comparison. In some embodiments, the capacitor Ck is discharged initially (in phase 2). In some embodiments, after the voltages of capacitor C1 and Ck are merged, then:

$$V(Ck) = V(C1) \cdot \frac{C1}{C1 + Ck} \quad (15)$$

where, $$\frac{C1}{C1 + Ck} = \frac{1}{k} \quad (16)$$

Similarly, the equilibrium (10) results directly in the condition for voltage comparison (phase 3) as follows:

Vd(t1)−Vd(t2)=k·Vd(t1)

In some embodiments, amplifier 801 can be any comparator or amplifier with offset compensation. The residual offset of the amplifier can or should be less than 0.4 mV, for example. In various embodiments, the capacitors can be implemented as metal capacitors. In some embodiments, the capacitors can be implemented as transistors. In some embodiments, the capacitors can be implemented as a combination of the metal capacitors and transistors. In various embodiments, capacitors C1, C2, and C3 are linear capacitors.

There are basically four phases, which repeat in a continuous cycle. The first phase is a reset phase (tr) that is used to charge capacitors C1 and C2 to Vdd (for time tr). The second phase is a first sampling phase V(C1) in which both capacitors C1 and C2 are discharged and the diode voltage is sampled at time t1. The third phase is a second sampling phase V(C2) in which capacitor C2 is discharged for time t2 and V(PTAT) is compared to a previous and scaled version of V(C1). The previous version of V(C1) is the CTAT voltage while the term V(C1)−V(C2), which appears at the top plate of capacitor C1, is the PTAT voltage. The fourth phase is a scaling phase in which V(C1) is scaled and stored. In some embodiments, V(C1)−V(C2) is compared with k·V(C1). In some embodiments, the first and the fourth phases can be combined since C1 may not need to be explicitly reset. The resulting timing scheme is illustrated by FIG. 10.

Figure 10:
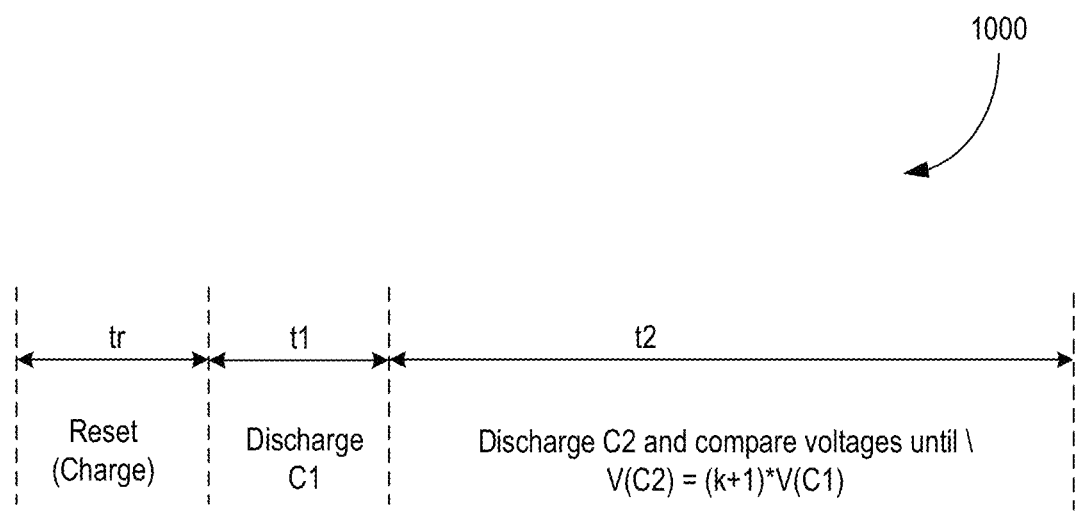
FIG. 10 illustrates a timing diagram of the switches of FIG. 8B to operate the thermal sensor, in accordance with some embodiments of the disclosure.

FIG. 10 illustrates timing diagram 1000 of the switches of FIG. 8A to operate the thermal sensor, in accordance with some embodiments of the disclosure. Timing diagram 1000 shows that pulses tr, t1, and t2 for resetting, and discharging capacitors. These pulses control the switch capacitor circuit of thermal sensor 800.

Referring back to FIG. 8A, Since the nwell-diode (D1) has the anode tied to substrate, a negative voltage is required for forward bias. Various embodiments implement a combined charge-pump and voltage sampling. In some embodiments, amplifier 801 is a comparator with autozero function, to perform comparison at time t2. During phase 4, a scaled version of V(C1) is stored on capacitor Caz, by charge-sharing with another capacitor Ck. In some embodiments, t2 time is measured and/or k-factor is altered to achieve equilibrium condition of equation (10).

After reset (e.g., phase 1, capacitor C2 is charged), switches S2 and S3 are closed and the anode of diode D1 is pushed to −Vdd. At the same time capacitor C1 will receive significant (pre-) charge from capacitor C2 through charge-sharing, if V(C1)<Vdd and if capacitance of capacitor C2 is greater than capacitance of capacitor C1. In that way a separate charging of C1 (tr*) can be omitted, if phase 1 and 4 are merged, in accordance with some embodiments.

Both capacitors discharge through diode D1 during phase 2, until the diode voltage Vd(t1) is sampled on C1 by opening switch S3. In phase 3, switch S2 is closed, and capacitor C2 keeps discharging through diode D1. The voltage at capacitor C1 top-plate follows the diode voltage and is described as Vptat(t)=V(C1)−V(C2), which is the PTAT voltage. This phase terminates at time t2 when the comparator switches, e.g., when V(Caz)=k·Vd(t1)=Vptat(t). Phase 4 implements the scaling of (the new) Vd(t1) by connecting Ck in parallel to C1, and at same time stores k·Vd(t1) at capacitor Caz, to cancel the amplifier offset for next comparison.

Figure 8B:
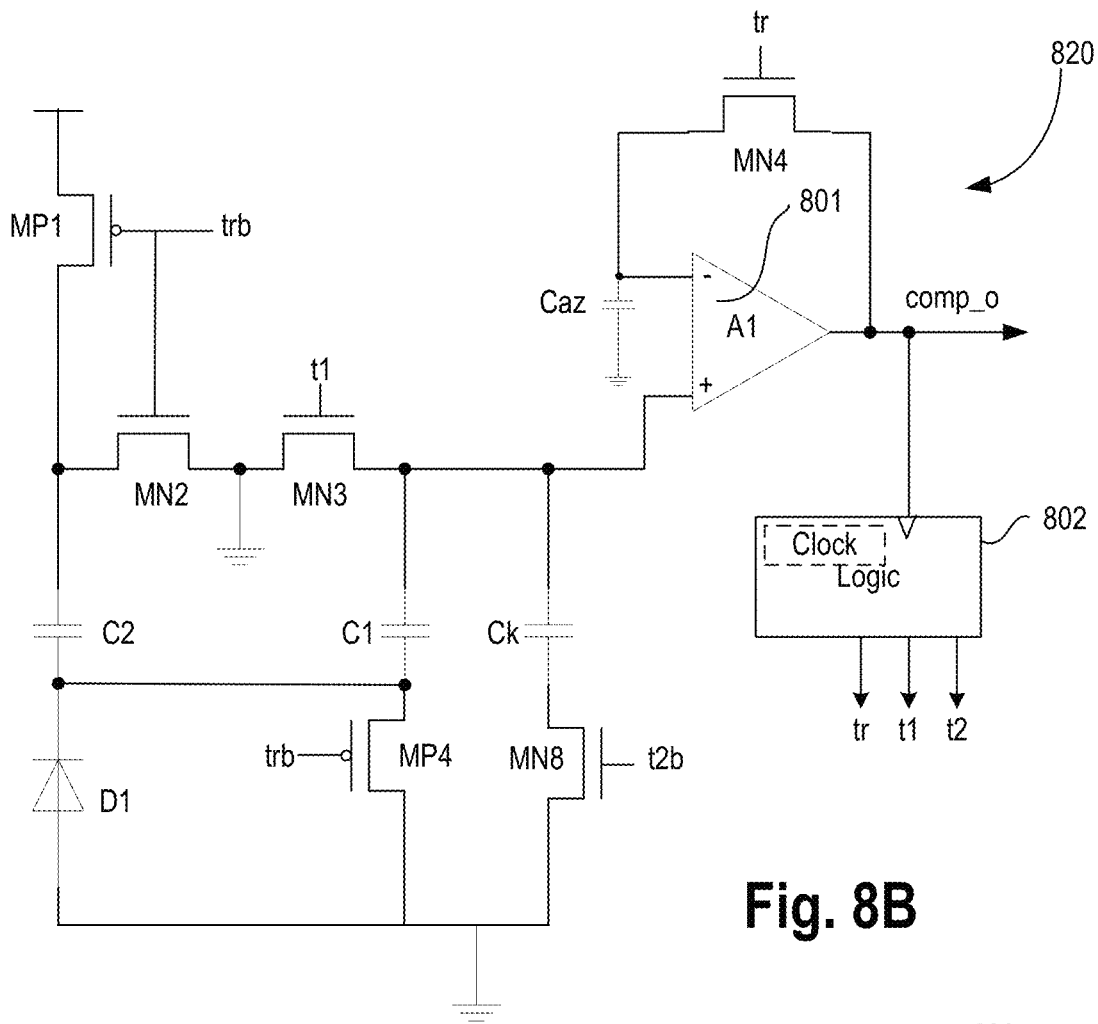
FIG. 8B illustrates a circuit-level schematic of a thermal sensor with switched capacitor scheme and duty-cycle output, in accordance with some embodiments of the disclosure.
Figure 8C:
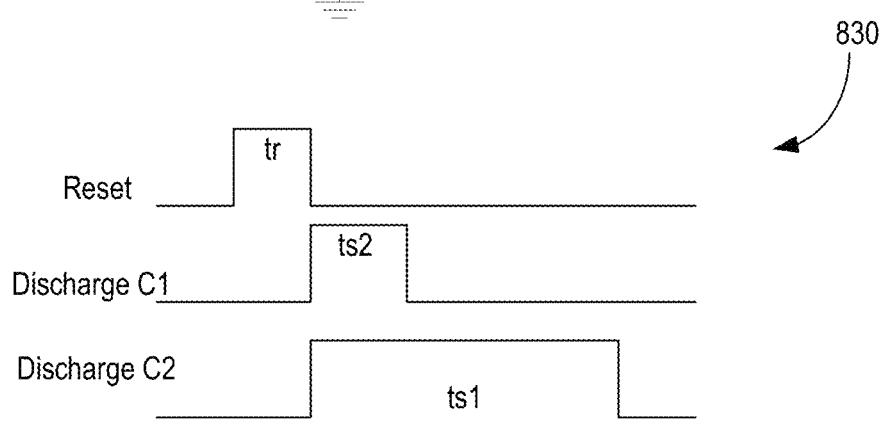
FIG. 8C illustrates a timing diagram associated with circuit-level schematic of FIG. 8B, in accordance with some embodiments.

FIG. 8B illustrates a circuit-level schematic of thermal sensor 820 with switched capacitor scheme and duty-cycle output, in accordance with some embodiments of the disclosure. FIG. 8C illustrates timing diagram 830 associated with circuit-level schematic of FIG. 8B, in accordance with some embodiments. The switches of FIG. 8A are implemented as transistors. In various embodiments, thermal sensor 900 comprises p-type transistor MP1 and MP4, and n-type transistors MN2, MN3, MN4, and MN8, diode D1, capacitors C1, C2, Ck, and Caz; amplifier or comparator 802 and logic 802 coupled together as shown.

In some embodiments, thermal sensor 820 realizes variable t2-period and a fixed Ck value for capacitor Ck. In some embodiments, capacitor Ck is binary weighted. In some embodiments, capacitor Ck is thermometer weighted. The sensor consumes merely one comparator, one diode, three capacitors and six transistor-switches, in accordance with some embodiments. Pulses tr and t1 are generated by logic 802 (e.g., counter or mono-flop), while comp_o signal determines t2 and triggers a next pulse sequence. The temperature is measured through evaluation of the (inverse) duty-cycle dc=(t1+t2)/t2. Therefore, it may not need an accurate clock source. In some embodiments, an internal RC oscillator may be used for the logic (RC timing impact cancels through pulse ratio). While the diode D1 of various embodiments is illustrated as a simple p-n junction, it can be a variety of different kinds of diodes such as Schottky diode.

Figure 9:
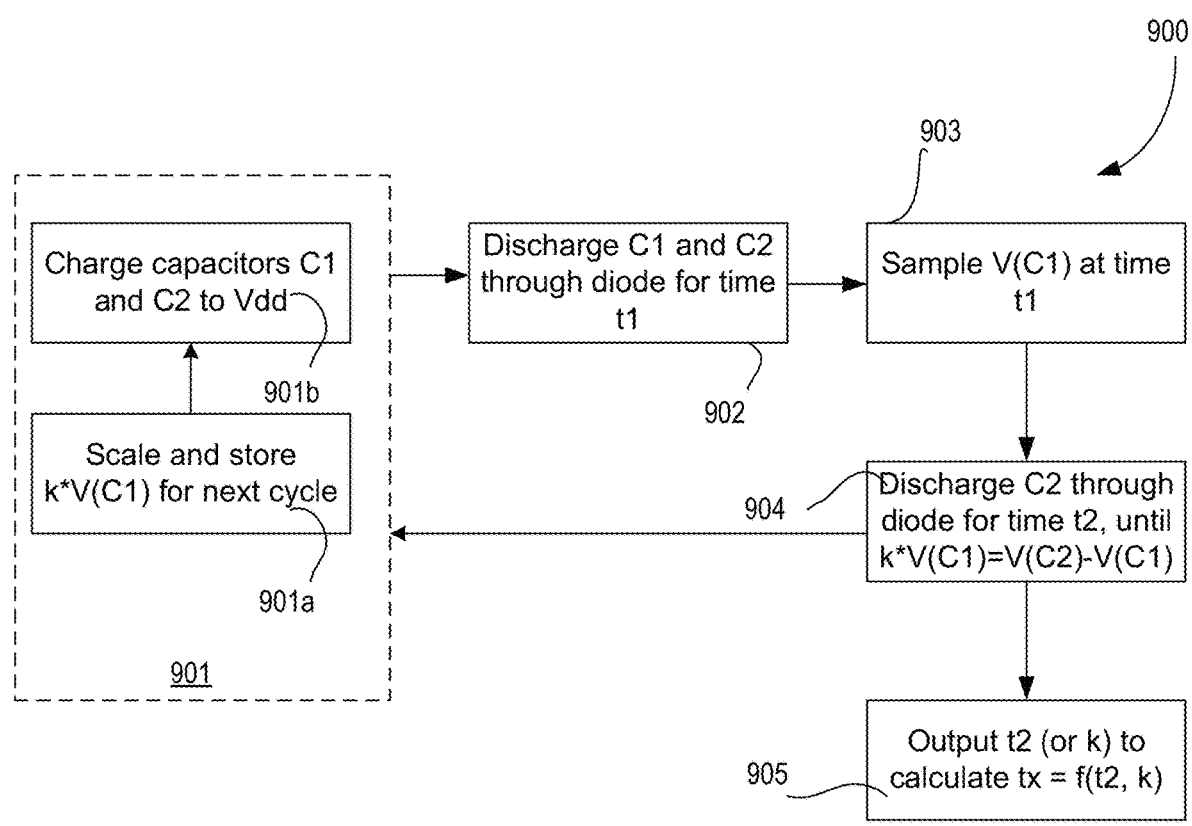
FIG. 9 illustrates a flowchart for operating the thermal sensor with the switched capacitor scheme, in accordance with some embodiments of the disclosure.

FIG. 9 illustrates flowchart 900 for operating the thermal sensor with the switched capacitor scheme, in accordance with some embodiments of the disclosure. In some embodiments, the process begins by scaling and storing the scaled voltage of capacitor C1 (e.g., k·V(C1)) as illustrated by block 901a. In some embodiments, the process begins by charging the capacitors C1 and C2 to a predefined voltage level (e.g., power supply level Vdd) as indicated by block 901b. With reference to FIG. 8B, capacitors C1 and C2 are charged by closing transistors MP1, MN2 and/or MN3. This is the reset phase.

Referring back to FIG. 9. at block 902, capacitors C1 and C2 are discharged through diode D for time t1. During this time, the voltage V(C1) on capacitor C1 is sampled as indicated by block 903. The sampling of V(C1) is the sampling phase. In this phase, both capacitors C1 and C2 are discharged and the diode voltage is sampled at time t1.

At block 904, capacitor C2 is discharged through diode D1 for time t2, where time t2 is greater than time t1, until k*V(C1)=V(C2)−V(C1). This is the third phase is a second sampling phase V(C2) in which capacitor C2 is discharged for time t2 and V(PTAT) is compared to a previous and scaled version of V(C1). The previous version of V(C1) is the CTAT voltage while the term V(C1)−V(C2), which appears at the top plate of capacitor C1, is the PTAT voltage.

The fourth phase is a scaling phase in which V(C1) is scaled and stored as indicated by block 901a of 901. In some embodiments, V(C2) is compared with k·V(C1). In some embodiments, the first and the fourth phases can be combined since C1 may not need to be explicitly reset. At block 905, t2 is used to calculate the temperature as a function of duty cycle.

Figure 11:
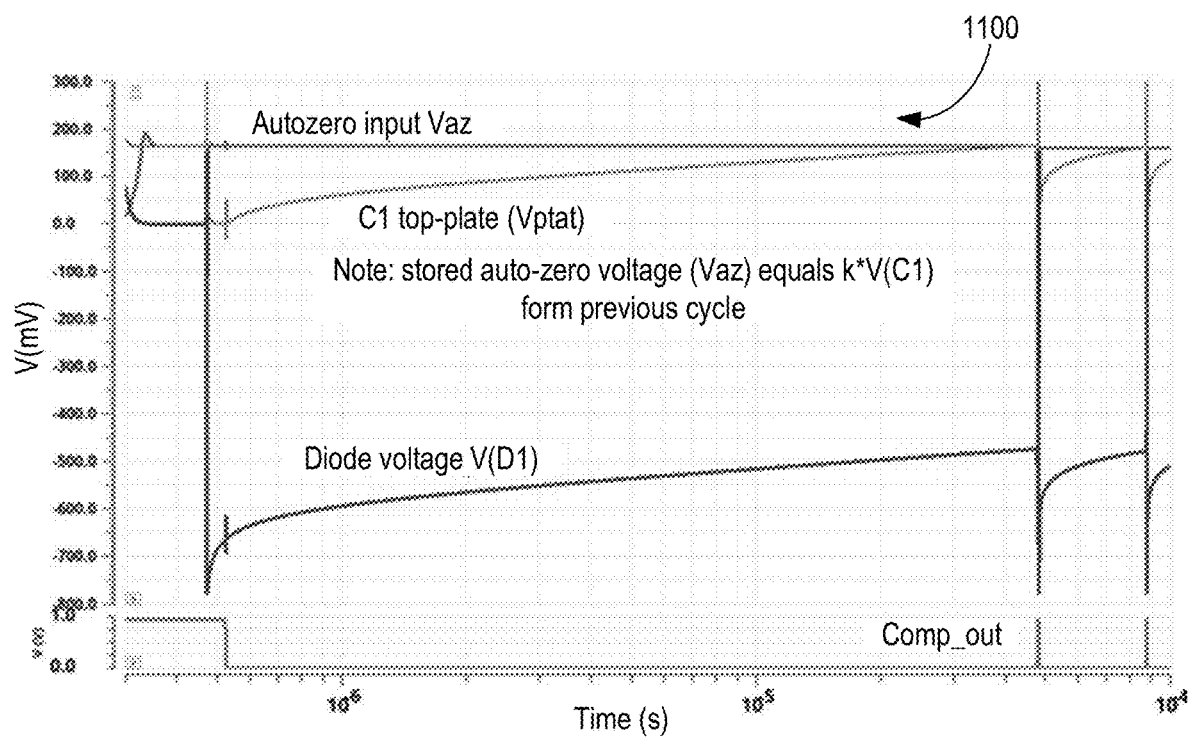
FIG. 11 illustrates a plot showing transients for voltages across the diode and at comparator terminals vs. log time, in accordance with some embodiments.

FIG. 11 illustrates plot 1100 showing transients for voltages across the diode and at comparator terminals vs. log time, in accordance with some embodiments. Plot 1100 shoes V(PTAT) following the diode voltage and approaching Vaz during ts2. At time of equality, the comp_out signal switches to high.

Figure 12:
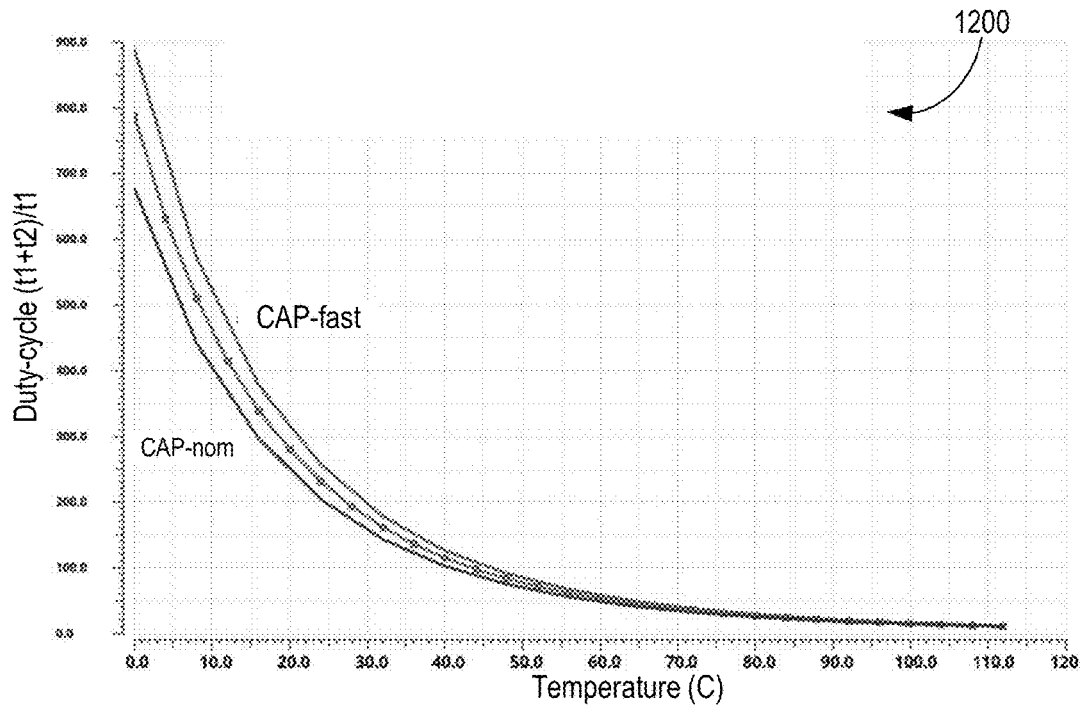
FIG. 12 illustrates a plot showing sensor transfer characteristic for different capacitor corners, in accordance with some embodiments.

FIG. 12 illustrates plot 1200 showing sensor transfer characteristic for different capacitor corners, in accordance with some embodiments. Plot 1200 explains the logarithmic behavior of the duty cycle code versus temperature, with the code varying from approximately 0 to 900 in this example. Plot 1200 also shows how the characteristic changes with manufacturing spread of capacitors, introducing a small uncertainty.

Figure 13:
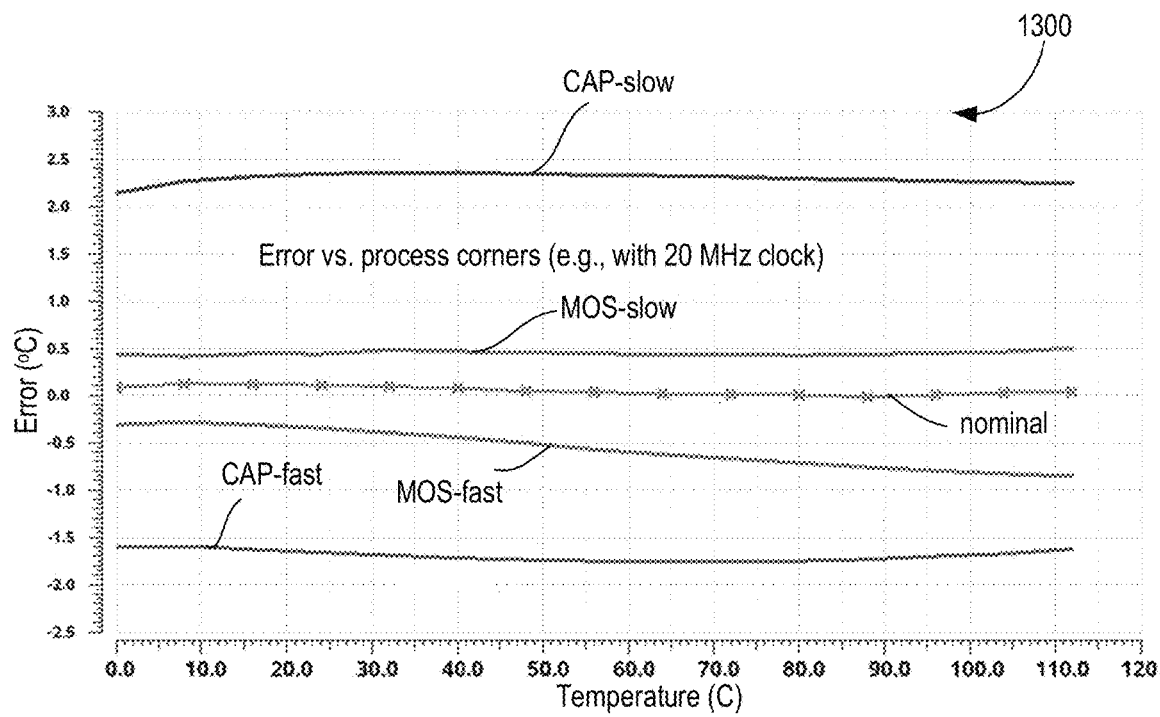
FIG. 13 illustrates a plot showing sensor error across temperature and skews, with fixed clock.

FIG. 13 illustrates plot 1300 showing sensor error across temperature and skews, with fixed clock. Plot 1300 shows that the impact of the transistor skews (e.g., MOS transistor) is low (e.g., less than 0.5° C.), which is an intrinsic feature of the capacitive bias technique. The major error source is the capacitance variation, for example.

Figure 14:
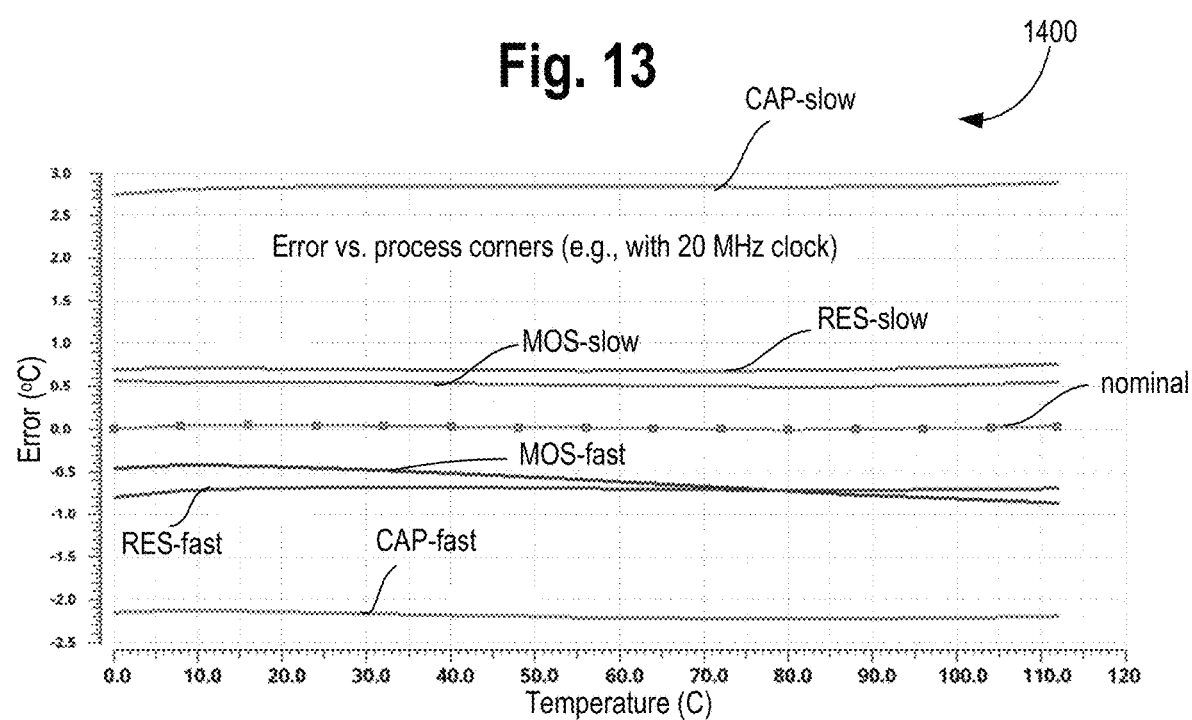
FIG. 14 illustrates a plot showing sensor error across temperature and skews, with an internal RC oscillator, in accordance with some embodiments.

FIG. 14 illustrates plot 1400 showing sensor error across temperature and skews, with an internal RC oscillator, in accordance with some embodiments. These plots show the simplicity and robustness versus process, which are major advantages of the circuit of various embodiment as shown by plots 1300 and 1400. The sensor can achieve less than 2.5° C. untrimmed error, dominated by Capacitor spread. The impact of diode variation is neglected here, due to its superior linearity from device physics. The capacitive bias scheme has intrinsic supply rejection, and allows accurate sensor operation down to Vdd=0.85V.

Figure 15:
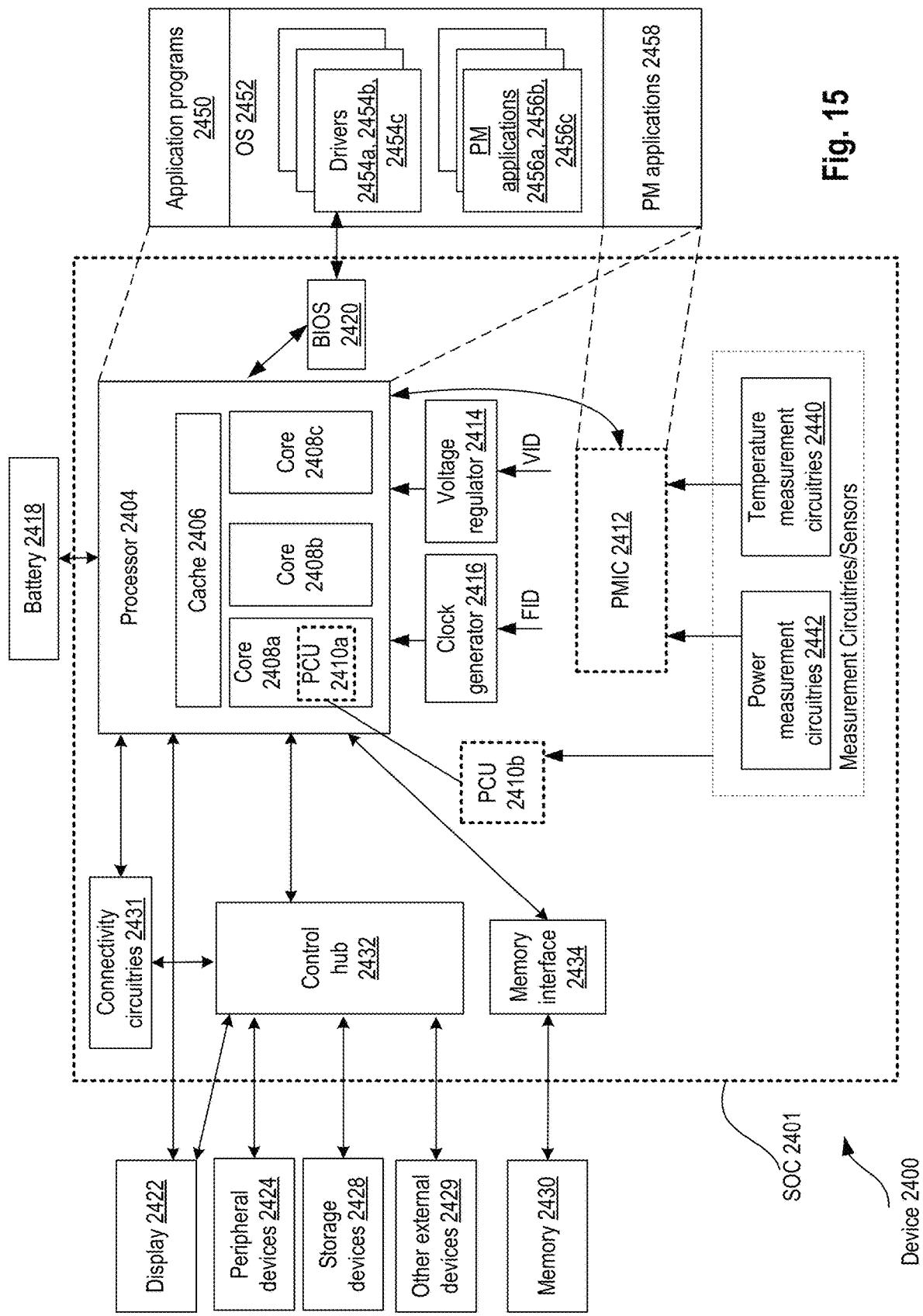
FIG. 15 illustrates a smart device or a computer system or a SoC (System-on-Chip) having a thermal sensor and/or a bandgap reference circuit, according to some embodiments of the disclosure.

FIG. 15 illustrates a smart device or a computer system or a SoC (System-on-Chip) having a thermal sensor and/or bandgap reference circuit, according to some embodiments of the disclosure. Any of the blocks of device 2400 can have one or more thermal sensor and/or bandgap reference circuit as described with reference to various embodiments.

In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises a SoC (System-on-Chip) 2401. An example boundary of the SOC 2401 is illustrated using dotted lines in FIG. 15, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408a, 2408b, 2408c. Although merely three cores 2408a, 2408b, 2408c are illustrated in FIG. 15, the processor 2404 may include any other appropriate number of processing cores, e.g., tens, or even hundreds of processing cores. Processor cores 2408a, 2408b, 2408c may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408a, a second section of cache 2406 dedicated to core 2408b, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 2404 may also include a bus unit to enable communication between components of the processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400. Memory can include nonvolatile (state does not change if power to the memory device is interrupted) and/or volatile (state is indeterminate if power to the memory device is interrupted) memory devices. Memory device 2430 can be a dynamic random access memory (DRAM) device, a static random access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408a, 2408b, 2408c, voltage regulator 2414, memory 2430, a mother-board of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 2410a/b and/or PMIC 2412. In some embodiments, each core has a network of distributed LDOs to provide efficient control for power management. The LDOs can be digital, analog, or a combination of digital or analog LDOs.

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410a. In an example, some other sections of PCU 2410 may be implemented outside the processing cores 2408, and these sections of PCU 2410 are symbolically illustrated using a dotted box and labelled as PCU 2410b. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456a, 2456b, 2456c. The OS 2452 may also include various drivers 2454a, 2454b, 2454c, etc., some of which may be specific for power management purposes. In some embodiments, device 2400 may further comprise a Basic Input/Output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Following examples are provided to illustrate the various embodiments. These examples can depend from one another in any suitable manner.

Example 1

An apparatus comprising: a diode comprising a p-n junction between a silicon substrate and a well; first, second, and third capacitors coupled to a cathode terminal of the diode; a first transistor coupled in series with the first capacitor and also coupled to a power supply node; a second transistor coupled in series with the second capacitor and also coupled to the power supply node, wherein the first and second transistors are controllable by a switchable signal; and a third transistor coupled in series with the third capacitor and to an anode of the diode.

Example 2

The apparatus of example 1 comprises a fourth transistor coupled to the first, second, and third capacitors and to the diode, wherein the fourth transistor is parallel to the diode.

Example 3

The apparatus of example 2 comprises a fifth transistor coupled to the first capacitor and the first transistor, wherein the fifth transistor is controllable by the switchable signal.

Example 4

The apparatus of example 3, wherein the switchable signal is a first switchable signal, wherein the apparatus comprises a sixth transistor coupled to the second capacitor and the second transistor, wherein the sixth transistor is controllable by a second switchable signal.

Example 5

The apparatus of example 4, wherein the third transistor is controllable by a third switchable signal.

Example 6

The apparatus of example 5, wherein the fourth transistor is controllable by a fourth switchable signal, wherein the fourth switchable signal is a level-shifted version of the first switchable signal.

Example 7

The apparatus of example 4, wherein source or drain terminals of the fifth and sixth transistor are coupled to ground.

Example 8

The apparatus of example 4 comprises: a seventh transistor coupled to the second transistor, second capacitor, and sixth transistor; and a fourth capacitor coupled to the seventh transistor.

Example 9

The apparatus of example 8, wherein the seventh transistor is controllable by a fifth switchable signal.

Example 10

The apparatus of example 9, wherein: the second switchable signal is a pulse, which arrives after a pulse of the first switchable signal; the third switchable signal is a pulse wider than a pulse width of the second switchable signal; and the fifth switchable signal is a pulse, which arrives after the pulse of the first, second, and third switchable signals.

Example 11

The apparatus of example 9, wherein the first switchable signal has a pulse width wide enough to charge the first, second, or third capacitors.

Example 12

The apparatus of example 9, wherein the second switchable signal has a pulse width wide enough to sample a charge of the second capacitor.

Example 13

The apparatus of example 9, wherein the third switchable signal has a pulse width wide enough to sample a charge of the first capacitor.

Example 14

The apparatus of example 9, wherein the fifth switchable signal has a pulse width wide enough to add charges on a node which couples the seventh transistor, the second transistor, the second capacitor, and the sixth transistor.

Example 15

An apparatus comprising: circuitry to generate first, second, third, and fourth switchable signal; a diode comprising a p-n junction between a silicon substrate and a well; and first, second, and third capacitors coupled to the circuitry and the diode, wherein: the first switchable signal is to charge the first and second capacitors to an arbitrary voltage level greater than a threshold level, and to discharge the third capacitor; the second switchable signal to discharge the first and second capacitors through the diode, and to sample a voltage from a charge on the second capacitor; the third switchable signal to discharge the first capacitor through the diode, and to sample a voltage from a charge on the first capacitor; and the fourth switchable to effectively subtract the sampled voltages on the first and second capacitors.

Example 16

The apparatus of example 15 comprises a first transistor coupled in series with the first capacitor and also coupled to a power supply node.

Example 17

The apparatus of example 16 comprises a second transistor coupled in series with the second capacitor and also coupled to the power supply node, wherein the first and second transistors are controllable by the first switchable signal.

Example 18

The apparatus of example 16 comprises a third transistor coupled in series with the third capacitor and to an anode of the diode.

Example 19

A system comprising: a memory; a processor coupled to the memory, wherein the processing includes a bandgap reference generator which includes: a diode formed by a p-n junction between a silicon substrate and a well; first, second, and third capacitors coupled to a cathode terminal of the diode; a first transistor coupled in series with the first capacitor and also coupled to a power supply node; a second transistor coupled in series with the second capacitor and also coupled to the power supply node, wherein the first and second transistors are controllable by a switchable signal; a third transistor coupled in series with the third capacitor and to an anode of the diode; and a wireless interface to allow the processor to communicate with another device.

Example 20

The system of example 19 comprises: a fourth transistor coupled to the first, second, and third capacitors and to the diode, wherein the fourth transistor is parallel to the diode; a fifth transistor coupled to the first capacitor and the first transistor, wherein the fifth transistor is controllable by the switchable signal, wherein the switchable signal is a first switchable signal; and a sixth transistor coupled to the second capacitor and the second transistor, wherein the sixth transistor is controllable by a second switchable signal.

Example 21

An apparatus comprising: a diode comprising a p-n junction between a silicon substrate and a well; a first capacitor coupled to the diode; a second capacitor coupled to the diode; at least six switchable transistors, two or more of which are to charge the first and second capacitors, and to discharge the first and second capacitors; an amplifier to compare voltages on the first and second capacitors, wherein the amplifier includes: a first input which is coupled to at least one of the first or second capacitors; and a second input which is coupled to an output of the amplifier via one of the at least six switchable transistors; a circuitry coupled to the output of the amplifier to generate switchable signals to control the at least six switchable transistors.

Example 22

The apparatus of example 21, wherein the circuitry comprises a counter and an RC oscillator to generate a clock for the counter.

Example 23

The apparatus of example 22, wherein a duty-cycle of output signals of the counter is to indicate a sensed temperature.

Example 24

The apparatus of example 21, wherein the at least six switchable transistors comprises: a first transistor controllable by a first signal, wherein the first transistor is coupled to the first capacitor; and a second transistor controllable by a second signal, wherein the second transistor is coupled to the amplifier and the first capacitor.

Example 25

The apparatus of example 24, wherein the at least six switchable transistors comprises: a third transistor coupled to the first capacitor and the first transistor, wherein the third transistor is controllable by a third signal; and a fourth transistor coupled to the first capacitor, wherein the fourth transistor is controllable by the first signal.

Example 26

The apparatus of example 25, wherein the at least six switchable transistors comprises: a fifth transistor coupled in parallel to a diode, wherein the fifth transistor is controllable by a fourth signal.

Example 27

The apparatus of example 26, wherein the at least six switchable transistors comprises: a sixth transistor; and a third capacitor coupled in series with the sixth transistor, wherein the third capacitor is to adjust the voltage of the terminal of the first capacitor.

Example 28

The apparatus of example 27, wherein the third capacitor has variable capacitance which is controllable by the circuitry.

Example 29

The apparatus of example 21, wherein the terminal of the first capacitor is a first terminal, wherein a second terminal of the first capacitor is coupled to the diode and to the second capacitor, and wherein an n-type region of the diode is coupled to the second terminal of the first capacitor, and wherein the p-type region of the diode is coupled to ground.

Example 30

The apparatus of example 21, wherein the circuitry comprises a successive approximation register.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a diode comprising a p-n junction between a silicon substrate and a well;
   first, second, and third capacitors directly coupled to a cathode terminal of the diode;
   a first transistor coupled in series with the first capacitor and also coupled to a power supply node;
   a second transistor coupled in series with the second capacitor and also coupled to the power supply node, wherein the first and second transistors are controllable by a switchable signal; and
   a third transistor coupled in series with the third capacitor and to an anode of the diode.

2. The apparatus of claim 1 comprises a fourth transistor coupled to the first, second, and third capacitors and to the diode, wherein the fourth transistor is parallel to the diode.

3. The apparatus of claim 2 comprises a fifth transistor coupled to the first capacitor and the first transistor, wherein the fifth transistor is controllable by the switchable signal.

4. The apparatus of claim 3, wherein the switchable signal is a first switchable signal, wherein the apparatus comprises a sixth transistor coupled to the second capacitor and the second transistor, wherein the sixth transistor is controllable by a second switchable signal.

5. The apparatus of claim 4, wherein the third transistor is controllable by a third switchable signal.

6. The apparatus of claim 5, wherein the fourth transistor is controllable by a fourth switchable signal, wherein the fourth switchable signal is a level-shifted version of the first switchable signal.

7. The apparatus of claim 4, wherein source or drain terminals of the fifth and sixth transistor are coupled to ground.

8. The apparatus of claim 4 comprises:
   a seventh transistor coupled to the second transistor, second capacitor, and sixth transistor; and
   a fourth capacitor coupled to the seventh transistor.

9. The apparatus of claim 8, wherein the seventh transistor is controllable by a fifth switchable signal.

10. The apparatus of claim 9, wherein:
    the second switchable signal is a pulse, which arrives after a pulse of the first switchable signal;
    the third switchable signal is a pulse wider than a pulse width of the second switchable signal; and
    the fifth switchable signal is a pulse, which arrives after the pulse of the first, second, and third switchable signals.

11. The apparatus of claim 9, wherein the first switchable signal has a pulse width wide enough to charge the first, second, or third capacitors.

12. The apparatus of claim 9, wherein the second switchable signal has a pulse width wide enough to sample a charge of the second capacitor.

13. The apparatus of claim 9, wherein the third switchable signal has a pulse width wide enough to sample a charge of the first capacitor.

14. The apparatus of claim 9, wherein the fifth switchable signal has a pulse width wide enough to add charges on a node which couples the seventh transistor, the second transistor, the second capacitor, and the sixth transistor.

15. An apparatus comprising:
    circuitry to generate first, second, third, and fourth switchable signal;
    a diode comprising a p-n junction between a silicon substrate and a well; and
    first, second, and third capacitors directly coupled to the circuitry and the diode, wherein:
    the first switchable signal is to charge the first and second capacitors to an arbitrary voltage level greater than a threshold level, and to discharge the third capacitor;
    the second switchable signal to discharge the first and second capacitors through the diode, and to sample a voltage from a charge on the second capacitor;
    the third switchable signal to discharge the first capacitor through the diode, and to sample a voltage from a charge on the first capacitor; and
    the fourth switchable signal to effectively subtract the sampled voltages on the first and second capacitors.

16. The apparatus of claim 15 comprises a first transistor coupled in series with the first capacitor and also coupled to a power supply node.

17. The apparatus of claim 16 comprises a second transistor coupled in series with the second capacitor and also coupled to the power supply node, wherein the first and second transistors are controllable by the first switchable signal.

18. The apparatus of claim 17 comprises a third transistor coupled in series with the third capacitor and to an anode of the diode.

19. A system comprising:
    a memory;
    a processor coupled to the memory, wherein the processor includes a bandgap reference generator which includes:
    a diode comprising a p-n junction between a silicon substrate and a well;
    first, second, and third capacitors directly coupled to a cathode terminal of the diode;
    a first transistor coupled in series with the first capacitor and also coupled to a power supply node;
    a second transistor coupled in series with the second capacitor and also coupled to the power supply node, wherein the first and second transistors are controllable by a switchable signal; and
    a third transistor coupled in series with the third capacitor and to an anode of the diode; and
    a wireless interface to allow the processor to communicate with another device.

20. The system of claim 19 comprises:
    a fourth transistor coupled to the first, second, and third capacitors and to the diode, wherein the fourth transistor is parallel to the diode;

a fifth transistor coupled to the first capacitor and the first transistor, wherein the fifth transistor is controllable by the switchable signal, wherein the switchable signal is a first switchable signal; and a sixth transistor coupled to the second capacitor and the second transistor, wherein the sixth transistor is controllable by a second switchable signal.

* * * * *